Aug. 19, 1924.  
J. MILLS  
1,505,276  
SYSTEM FOR LOCATING THE SOURCE OF SOUND  
Filed Nov. 18, 1921

Inventor:
John Mills.
by *[signature]*
Att'y.

Patented Aug. 19, 1924.

1,505,276

UNITED STATES PATENT OFFICE.

JOHN MILLS, OF WYOMING, NEW JERSEY, ASSIGNOR TO WESTERN ELECTRIC COMPANY, INCORPORATED, OF NEW YORK, N. Y., A CORPORATION OF NEW YORK.

SYSTEM FOR LOCATING THE SOURCE OF SOUND.

Application filed November 18, 1921. Serial No. 516,033.

*To all whom it may concern:*

Be it known that I, JOHN MILLS, a citizen of the United States, residing at Wyoming, in the county of Essex, State of New Jersey, have invented certain new and useful Improvements in Systems for Locating the Source of Sound, of which the following is a full, clear, concise, and exact description.

This invention relates to systems for locating the source of sound and particularly to an electric compensator and an efficient arrangement of the phase controlling elements of such a compensator for use in such systems.

An object of the invention is to provide phase controlling elements associated with an adjustable electrical compensator in such a manner that wide fluctuations in phase are eliminated.

In certain systems for determining the location of a source of sound vibrations, the necessary parts comprise a plurality of sound-actuated means for converting sound vibrations into equivalent electrical impulses, adjustable electrical transmission circuits associated with each of said means and comprising compensating elements for synchronizing the transmitted electrical impulses, and receiving or comparing means electrically associated with the compensating transmission circuits at their point of adjustment. In the present invention, an improvement in the compensating transmission circuits above mentioned is contemplated. The usual form of compensator circuit comprises inductance elements in series and capacity elements in parallel but arranged to group the various elements so that each inductance element has a related capacity element electrically associated with it to form what is commonly called an L-section. When such L-sections are connected to appropriate switching mechanism, they may be switched into and out of circuit or transferred from one circuit to another. But, since it has been found desirable to maintain continuity in the circuit during the switching of sections, a subsidiary and transient circuit is made, while adjusting the switching mechanism from one section to another, such that an inductance element is shunted by switch fingers and thus removed electrically from the circuit while the associated capacity element remains in circuit. This transient circuit is of necessity such as to cause a partial reversal of the phase relation of currents traversing the circuits under comparison and tends to produce confusion in the use of the receiving or comparing means before mentioned.

The present invention provides a compensating circuit wherein the sections are composed of inductance elements and capacity elements connected in T-formation, the inductance elements of a section forming the head of the T and the capacity element of the same section forming the tail of the T. With this type of connection, the shunting of the inductance elements does not electrically eliminate them from the circuit but merely connects the two halves of an inductance element in parallel and puts this parallel combination in series with the capacity element. The values of the inductance and capacity elements may be so calculated that a series parallel combination, obtained as above-mentioned, decreases the tendency to phase reversal.

Referring to the drawings.

Figure 3:
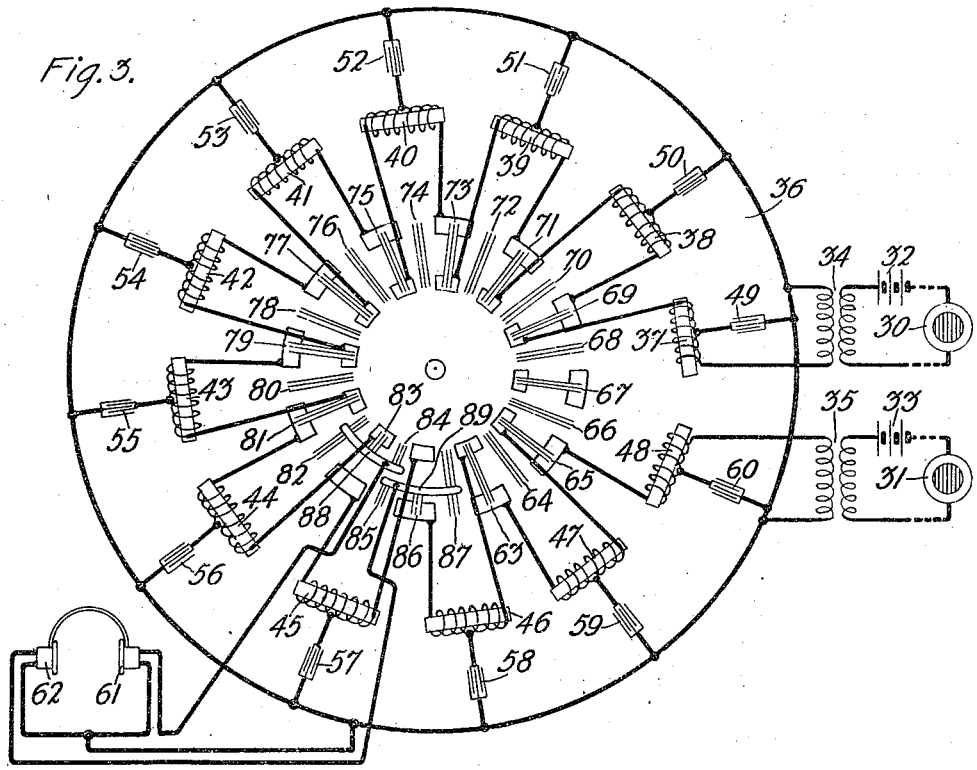
Figure 4:
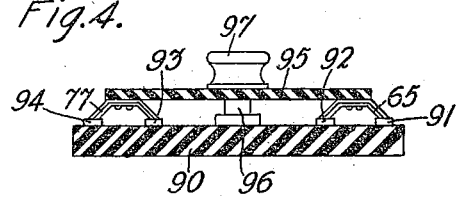

Fig. 3 discloses the preferred arrangement of T section artificial line in combination with switching mechanism arranged to give the associated circuits proper artificial line termination; and Fig. 4 discloses a side section of a contact switching mechanism such as may be used in effecting circuit combinations as described.

Figure 1:
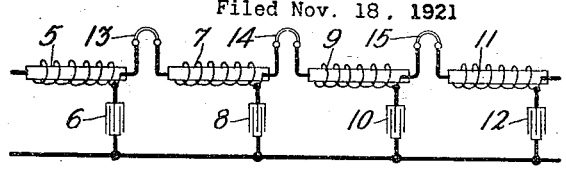
Fig. 1 illustrates diagrammatically the circuit connections of an L-section artificial line.

Referring more in detail to Fig. 1, there is disclosed an artificial line composed of sections which are commonly referred to as L sections. Each of these sections consists of an inductance adapted to be placed in series with the line and a capacity arranged to be bridged across the line at the point of connection of the corresponding inductance of the section. Thus, inductance 5 is combined with capacity 6 to form one section of the line. Likewise the inductances 7, 9 and 11 are combined with capacities 8, 10 and 12, respectively, to provide additional sections. By means of sliding contact bars 13, 14 and 15, it is possible to connect the various sections in such a manner that the inductance elements are all in series with one side of the line and the capacity elements are bridged across the line at the points of switching connection. Attention is directed to the fact that, if it becomes necessary during switching operations involving this artificial line to short-circuit the inductance elements of any section as, for instance, 7, this inductance is electrically eliminated from the circuit, but the capacity element of that section is left in circuit, giving an unbalanced condition relative to the terminal apparatus connected thereto.

Figure 2:
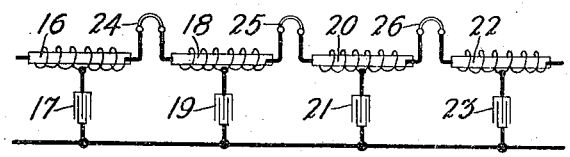
Fig. 2 illustrates diagrammatically the circuit connections of a T section artificial line.

Referring to Fig. 2, there is disclosed a combination of inductance and capacity elements similar to Fig. 1, except that the capacity elements are connected at the midpoints of the various inductance elements instead of at the contact block terminals, thus forming a T section artificial line. For example, associated with the inductance element 16 is the capacity element 17 having one terminal connected to the midpoint of inductance 16 and its other terminal connected to a common shunt wire, and associated with the inductance element 18 is the capacity element 19 having one terminal connected to the midpoint of inductance 18 and its outer terminal connected to the common shunt wire, etc. Connection between the various sections is effected by sliding contact bars 24, 25, 26 in such a manner that the inductance elements are normally all in series with one side of the line and the capacity elements are bridged across the line at points midway between the points of switching connection. Attention is directed to the fact that, if it becomes necessary during switching operations involving this artificial line, to short-circuit any inductance element, as, for instance, 18, this inductance element is not electrically eliminated from the circuit as was the case in an L section line described above. With a short-circuit connection across the switching terminals of 18, a local or transient series-parallel circuit is formed with the two halves of inductance element 18 in parallel and capacity element 19 in series with the parallel combination. The inductance element may be so calculated and constructed relative to the capacity element associated with it as above, that this series-parallel combination gives only a slight capacity effect as compared with that obtained when an L section line is used.

Fig. 3 discloses a plurality of means 30, 31 for converting sound vibrations into electrical impulses, sources of electrical energy 32, 33 therefore, connected, respectively, in series with said converting means 30, 31 and with the primary windings of induction coils 34, 35. The secondary windings of induction coils 34, 35 are connected to an artificial line 36 which is composed of inductance elements 37 to 48 inclusive, so arranged that they may be connected in series, and capacity elements 49 to 60 inclusive, which may be connected in parallel with said inductance elements in such a manner as to form T sections, wherein the capacity element is the shank or tail of the T and the two halves of an inductance element form the top of the T. Switching mechanism of rotary type is provided whereby the sections of artificial line 36 are connected in series except at one point where the continuity of the artificial line circuit is broken and receiving means 61, 62 are connected respectively to the line ends so formed. The series connection mentioned is accomplished by contact bars 63 to 87 co-operating with contact blocks to which inductance element terminals are connected and continuity of series connection during the operation of the switch mechanism is maintained by having twice as many contact bars as contact block sets so that contact is made by a dead bar before a live bar leaves a contact block set. In the setting of the switching mechanism disclosed in the drawing, the artificial line circuit is opened between contact bars 83 and 86 due to the fact that bars 83 to 86 inclusive are one-half the length of the other contact bars, and thus make contact with only one contact block each. Bars 82, 83 and 84 are bridged together by connecting bar 88, and bars 85, 86 and 87 are bridged by connecting bar 89. These bridging bars are connected respectively to one terminal of each receiving means 61, 62. The remaining terminals of the receiving means are connected together and the common return wire of the aritificial lines disclosed as associated each with its own sound converting means and receiving means, the lengths of these artificial lines being dependent on the position of the switching mechanism and said lengths bearing an inverse relationship to each other.

To facilitate description of the operation of the apparatus disclosed, let it be assumed that a source of sound vibration is at a point not equidistant from the sound converting means 30 and 31. In such a case, a sound wave front will reach one of the sound converting means, let us say 30, earlier in point of time than it will reach the other means 31. The electrical impulses produced in the primary winding of 34 will occur earlier than equivalent electrical impulses in the primary winding of 35. The electrical impulses repeated in the secondary windings of 34 and 35 will bear the same phase relation as the primary circuits. The impulses from 34 travel in a counter-clockwise direction over the artificial line 36 and are retarded thereby. In detail these impulses travel in series through inductance elements 37 to 44 inclusive, with capacity elements 49 to 56 inclusive, in parallel to the terminal of inductance element 44, and then assuming the switching mechanism properly adjusted as shown, through contact bar 83, connecting piece 88, receiving means 61, and back through the common return wire of artificial line 36 to the secondary winding of 34. In a similar manner, the electrical impulses induced in the secondary winding of 35 travel in a clockwise direction over artificial line 36 and are retarded thereby. In detail these impulses pass through inductance elements 48 to 46 inclusive in series, with capacity elements 58 to 60 inclusive, in parallel, to the terminal of inductance element 46, and then through contact bar 86, connecting bar 89, receiving means 62 and back through the common return wire of artificial line 36 to the secondary winding of 35. If the switching mechanism is properly adjusted, as above mentioned, the electrical impulses in the receiving means 61, 62 will register in synchronism, the difference in phase in the incoming impulses, being adjusted by the difference in amounts of artificial line in the circuits used. The artificial line is so constructed that the position of the point of attachment of receiving means 61, 62 indicates the direction of the source of sound.

One feature of this invention is best illustrated if the switching mechanism be conceived as rotated counter-clockwise one step from its present position. In this new position, inductance element 45 will be short-circuited by a connection through contact bar 82, connecting bar 88 and contact bar 84. Also inductance element 46 will be short-circuited by a connection through contact bar 85, connecting bar 89 and contact bar 87. In the method of switching described, these short-circuit conditions appear necessary in passing from one complete step to another so that the continuity of circuits may not be broken. It is to be noted that with an artificial line of T section as disclosed, even during the transient short circuit step described, the effect of the inductance elements is not wholly lost as, upon short circuit, these inductance elements with their related capacity elements form transit series-parallel circuits as described in connection with Fig. 2. These circuits may have their component parts so calculated and constructed as to give the effect of a simple resistance in series with a capacity as a termination of the line at the point of output to the receiving means.

The termination of both artificial line circuits alike under any and all switching conditions and the termination of said line circuits under local short circuit conditions in the manner described above, is extremely desirable in that violent fluctuations in the phase of received current impulses, due solely to circuit conditions, are avoided. The said fluctuations are disconcerting to quick and accurate adjustment of the apparatus.

Figure 4 discloses in vertical section an insulating mounting plate 90 on which are mounted contact blocks 91, 92, 93 and 94. Cooperating with these blocks are contact bars 65, 77 attached to a rotary insulating plate 95, which in turn is attached to a central shaft 96. Plate 95 and its attached contact bars may be rotated by hand wheel 97.

What is claimed is:

1. In a system for locating the source of sound variations, the combinations of a plurality of transmitting devices, a phase indicating device and an adjustable electrical compensator comprising a plurality of T sections of artificial line, each section composed of a capacity element forming the shank of the T and two windings of an inductance element forming the two branches of the top of the T, and adjustable switching mechanism cooperative with said sections and said indicating device.

2. In a system for locating a source of sound vibrations, the combinations of a plurality of means for converting sound vibrations into electrical impulses, a plurality of receiving means each adjustably associated therewith through groups of phase adjusting T connected sections of artificial line, said sections and receiving means being connected by switching means adapted to properly connect said sections to each other and to synchronously terminate each of said groups of sections at its point of connection to said receiving means in like impedances.

3. In a system for locating a source of vibrations; a plurality of means for converting vibrations into electrical impulses; a plurality of T connected sections of artificial line actively associated with each of said converting means to modify the phase of the electrical impulses, said line sections comprising inductance and capacity; and means to decrease the number of line sections actively associated with a converting means by first short circuiting the inductance of a section and then disconnecting the section.

In witness whereof, I hereunto subscribe my name this 15th day of November, A. D., 1921.

JOHN MILLS.